Patented Jan. 4, 1927.

1,613,055

UNITED STATES PATENT OFFICE.

GEORGE I. RAY, OF CHARLOTTE, NORTH CAROLINA.

COMPOSITION FOR STOPPING LEAKS IN HOT-WATER CIRCULATING SYSTEMS.

No Drawing. Application filed June 10, 1926. Serial No. 115,123.

This invention relates to novel means for stopping leaks in hot water circulating systems, such as automobile radiators, boilers, piping, steam and hot water radiators, cylinder blocks in engines, pumps and the like.

Heretofore it has been customary to introduce into hot water circulating systems, and the like, a quantity of flaxseed meal and other vegetable substances, such as vegetable cement. The flaxseed meal and other substances will circulate in the system, and will eventually find their way to the leak, and become lodged in the same, and with the aid of the cement and other vegetable substances will close the hole in the system. The disadvantage of this vegetable composition is that this matter sometimes lodges in some part of the system and clogs the same, while the cement and other vegetable substances will form a coating over the interior surface of the circulating system, and in the case of automobile radiators will prevent the water from cooling when passed therethrough. This renders it necessary to dismantle the radiator and clean the same before it is further used. These substances also have a tendency to crack after once being formed, thus causing the leak to be renewed, also when the system is drained, the leak breaks forth anew, and the whole operation must be repeated.

In my present invention, I have provided a composition which, when once formed to stop a leak, will become a permanent part of the system. I attain this object by introducing into the hot water circulating system a composition of powdered aluminum, flaxseed meal, sulphur and soap in about the following proportions:

| | Per cent |
|---|---|
| Powdered aluminum | 15 |
| Flaxseed meal | 60 |
| Sulphur | 5 |
| Soap | 20 |

This composition is introduced into the hot water circulating system and mixes with the water therein, and in passing by any leak in the system will be pulled into said leak by the flow of the water. The flaxseed meal contains linseed oil, and this and the soap acts as a carrier of the aluminum and other substances to the leak, where the flaxseed meal will become lodged in leak, and the aluminum, sulphur and oil will gradually become oxidized and close the leak by the building up of the oxidized aluminum, and will result in a tough, fibrous, metallic patch over the leak which will not be affected by jolts, or by draining the system.

The soap contained in the mixture acts as an agent for the suspension of the aluminum and flaxseed, and also acts as a cleanser for the interior of the system. It also cleanses the surface surrounding the leak and causes the oxidized aluminum to permanently cling to the surface which surrounds the leak.

No one particle of the flaxseed or aluminum is supposed to stop the leak, but the leak is gradually closed by a succession of particles of aluminum oxide being built up around the leak, until the leak is closed. This does not ordinarily take longer than five minutes.

The sulphur is added to the composition, and acts as an insecticide to kill all germ life in the flaxseed meal, and to cause the flaxseed meal to remain fresh after being placed in the compound, and the sulphur forms with the linseed oil, such as that which is present in the flaxseed meal, a rubbery insoluble compound which hardens into a clinging, obstructive substance which aids in the stopping of leaks. That when the ingredients in the proportions specified, or in any near ratio to the proportions specified, are placed in the warm water in an automobile radiator or other hot water circulating system, the action of the soap will be to form aluminum hydroxide which acts upon some of the free soap which is soluble, to form an insoluble soap. A small quantity of aluminum hydroxide will render a large quantity of soluble soap into an insoluble state, such as the smilar action which takes place in forming the speaking soaps used in phonograph records. The sulphur acts on the linseed oil contained in the flax seed meal to produce an insoluble elastic compound which acts as a binder for the insoluble soap and the flexseed meal. The insoluble soap having been formed by the interaction of aluminum hydroxide upon soluble soap in conjunction with the flaxseed meal and the free soap is carried to the leaks and held in place until solidified by the action of the heat upon the sulphur and the oil in the flaxseed meal, and the insoluble soap is kept in suspense and also carried to and kept in places where needed by the peculiar compound formed by the oils in the flaxseed meal and the surplus free soap.

The soap acts as a suspending agent for the aluminum, flaxseed meal and the sulphur. Soap also reacts chemically with the aluminum to form insoluble aluminum compounds.

In the case of the automobile radiator, the heat formed by the running of the engine will aid in the process of oxidization.

What I desire to protect and secure by Letters Patent is as follows:

1. A composition for stopping leaks in hot water circulating systems comprising a mixture of aluminum, flaxseed meal, sulphur and soap.

2. A composition for stopping leaks in automobile radiators comprising a mixture of aluminum, flaxseed meal and soap.

In testimony that I claim the foregoing as my own, I have signed my name to this specification.

GEORGE I. RAY.